(12) United States Patent
Lienert et al.

(10) Patent No.: US 9,109,079 B2
(45) Date of Patent: Aug. 18, 2015

(54) ECO-FRIENDLY SOLDERABLE WIRE ENAMEL

(75) Inventors: Klaus-W. Lienert, Hamburg (DE); Ding Wang, Tongling (CN); Lixin Ye, Tongling (CN); Changshun Zhou, Tongling (CN); Wenxue Guo, Tongling (CN)

(73) Assignee: ELANTAS GMBH, Wesel (DE)

( * ) Notice: Subject to any disclaimer, the term of this patent is extended or adjusted under 35 U.S.C. 154(b) by 988 days.

(21) Appl. No.: 13/201,235

(22) PCT Filed: Feb. 1, 2010

(86) PCT No.: PCT/EP2010/051182
§ 371 (c)(1),
(2), (4) Date: Nov. 8, 2011

(87) PCT Pub. No.: WO2010/094556
PCT Pub. Date: Aug. 26, 2010

(65) Prior Publication Data
US 2012/0045571 A1 Feb. 23, 2012

(30) Foreign Application Priority Data
Feb. 20, 2009 (DE) .......................... 10 2009 003 512

(51) Int. Cl.
| | | |
|---|---|---|
| *C09D 167/02* | (2006.01) | |
| *B05D 5/12* | (2006.01) | |
| *C08G 18/80* | (2006.01) | |
| *C08G 18/42* | (2006.01) | |
| *C09D 175/04* | (2006.01) | |
| *C09D 175/06* | (2006.01) | |
| *C09D 175/12* | (2006.01) | |
| *H01B 3/30* | (2006.01) | |
| *H01B 3/42* | (2006.01) | |

(52) U.S. Cl.
CPC ............ *C08G 18/8067* (2013.01); *C08G 18/42* (2013.01); *C09D 175/04* (2013.01); *C09D 175/06* (2013.01); *C09D 175/12* (2013.01); *H01B 3/302* (2013.01); *H01B 3/308* (2013.01); *H01B 3/423* (2013.01)

(58) Field of Classification Search
CPC ................................ C09D 167/02; B05D 5/12
USPC ........................................... 427/117; 524/539
See application file for complete search history.

(56) References Cited

U.S. PATENT DOCUMENTS

| | | | | |
|---|---|---|---|---|
| 3,960,799 | A * | 6/1976 | Mosimann et al. ........... | 523/454 |
| 4,119,605 | A | 10/1978 | Keating | |
| 4,239,814 | A * | 12/1980 | Nagel ........................... | 427/120 |
| 4,362,861 | A | 12/1982 | Shen | |
| 4,511,624 | A | 4/1985 | Kawaguchi et al. | |
| 5,403,615 | A * | 4/1995 | Winkler et al. ............... | 427/117 |
| 5,510,432 | A * | 4/1996 | Schmalstieg et al. ......... | 525/528 |
| 5,736,193 | A * | 4/1998 | Schink et al. ................. | 427/117 |
| 5,854,334 | A | 12/1998 | Schink et al. | |
| 6,111,048 | A | 8/2000 | Asahina et al. | |
| 6,512,073 | B2 | 1/2003 | Gertzmann et al. | |
| 7,521,498 | B2 * | 4/2009 | Stevens et al. ................ | 524/315 |
| 8,574,672 | B2 * | 11/2013 | Doreau et al. ................ | 427/239 |
| 2002/0077442 | A1 * | 6/2002 | Gertzmann et al. ........... | 528/44 |
| 2005/0014012 | A1 * | 1/2005 | Stapperfenne et al. ....... | 428/480 |
| 2006/0036009 | A1 * | 2/2006 | Stevens et al. ................ | 524/315 |
| 2006/0165983 | A1 * | 7/2006 | Yoon ............................. | 428/375 |
| 2007/0031672 | A1 * | 2/2007 | Boehm et al. ................. | 428/375 |
| 2007/0087201 | A1 * | 4/2007 | Wimmer et al. .............. | 428/413 |
| 2008/0153993 | A1 * | 6/2008 | Boehm et al. ................. | 525/418 |
| 2012/0045571 | A1 * | 2/2012 | Lienert et al. ................ | 427/117 |
| 2012/0125799 | A1 * | 5/2012 | Doreau et al. ............. | 206/524.3 |

FOREIGN PATENT DOCUMENTS

| | | |
|---|---|---|
| CN | 1205717 A | 1/1999 |
| CN | 1546586 A1 | 11/2004 |
| DE | 1957157 | 5/1971 |
| DE | 2840352 A1 | 3/1979 |
| DE | 3938058 A1 | 5/1991 |
| DE | 4307848 A1 | 9/1994 |
| JP | H05501890 A | 4/1993 |
| JP | H08507561 | 8/1996 |
| WO | 91/07469 | 5/1991 |
| WO | 2009090261 A1 | 7/2009 |

OTHER PUBLICATIONS

Wikipedia: Solvent Naphtha; http://de.wikipedia.org/wiki/Solvent_Naphtha (2012).
Wikipedia: Kresole; http://de.wikipedia.org/wiki/Kresole (2012).

* cited by examiner

*Primary Examiner* — Michael Pepitone
*Assistant Examiner* — Michael A Salvitti
(74) *Attorney, Agent, or Firm* — Abel Law Group, LLP

(57) ABSTRACT

Described is a polyurethane wire enamel composed of at least one blocked polyisocyanate adduct, blocked with alkylphenols, at least one hydroxy polyester comprising ester and/or imide and/or amide groups, at least one hydrocarbon-based organic solvent, and further auxiliaries and additives.

20 Claims, No Drawings

ECO-FRIENDLY SOLDERABLE WIRE ENAMEL

All of the documents cited in the present specification are incorporated by reference in their entirety into the present disclosure.

BACKGROUND OF THE INVENTION

1. Field of the Invention

The present invention relates to an environmentally compatible and solderable wire enamel for producing solderable coatings on wires, on the basis of polyurethanes in solution in hydrocarbons.

2. Discussion of Background Information

Polyurethanes as electrically insulating coating materials based on hydroxyl-containing polyesters and blocked isocyanates are known in large numbers and described in, for example, DE 195 71 57, DE 100 51 392 and DE 195 07 942. In the context of their use as wire-coating materials, electrically insulating coating materials of this kind are notable in particular for their good insulating properties. Another advantage they possess is that of being solderable. When immersed into a solder bath which has been heated to elevated temperatures, solderable insulated wires undergo destruction of the insulating layer to expose the bare metal of the conductor, which is therefore directly accessible for electrically conducting connections. The solderability is attributable to the presence of urethane groups in the enamel film.

State of the art are polyurethane wire enamels composed of hydroxyl-comprising polyesters, blocked isocyanates, catalysts, auxiliaries, and a complex solvent mixture. Principal solvents are cresolic solvents, which are blended with aromatic hydrocarbons. Cresols and xylenols are solvents which are available technically. Since they constitute distillation cuts, the isomer composition varies from one grade to another. A considerable disadvantage is that all cresolic solvents are toxic and carry an extremely unpleasant odor.

These wire enamels are processed on commercial wire enameling lines, in which the solvent mixture is evaporated off and the binder is cured. The solvent removed by evaporation is burnt on the enameling line and used as part of the heating for the curing oven.

DE 27 18 898 and EP 0 055 085 disclose coating materials comprising polyesterimides which comprise blocked isocyanates. One of the characteristics of the coating materials described therein, however, is that they are not solderable.

Cresol-free wire enamels are known, the cresolic solvent being replaced by a different solvent. For example, methyldiglycol, ethyldiglycol, gamma-butyrolactone (Lienert in "Lösemittel für kresolfreie Drahtlacke", 8th Conference on Electrical Insulating Systems, Hamburg 1989), alkylene carbonates (EP 0 502 858), and many others may be used. As a result of the fact that the alternative solvents usually have a lower calorific value than their cresolic counterparts, there is a reduction in energy to the enameling machine.

Problem

The problem addressed by the present invention was that of developing a solderable coating material for wires that is in cresol-free solution. The alternative solvent is to be a commercial solvent, be effective in dissolving all of the components of the enamel, and have such a high heat of combustion that the existing enameling lines can be operated therewith without the need for additional energy, in the form of electrical current, for example, to be supplied.

Solution

Surprisingly it has been possible to meet the problem by formulating solvent naphtha-soluble, modified hydroxyl-containing polyesters with special blocked isocyanate adducts, hydrocarbon-based organic solvents, and also the customary catalysts and enamel auxiliaries.

A key part here is played by the blocking agent of the isocyanates.

DEFINITIONS

In the context of the present invention, all quantities, unless indicated otherwise, are to be understood as amounts by weight (e.g., % by weight).

In the context of the present invention, the term "room temperature" means a temperature of 20° C. Temperature data, unless otherwise indicated, are in degrees Celsius (° C.).

Unless indicated otherwise, the cited reactions and method steps are carried out under standard pressure (atmospheric pressure).

The expression (meth)acryl—is intended in the context of the present invention to encompass not only methacryl—but also acryl-, and mixtures of both.

The expression alkylphenols, unless indicated otherwise, represents, in the context of the present invention, phenols substituted on the benzene nucleus by one to five $C_1$-$C_5$ alkyl groups, with the proviso that, in the case of single substitution, the alkyl radical comprises at least two carbon atoms.

SUMMARY OF THE INVENTION

The invention provides polyurethane wire enamels composed of:
A) 10%-60%, preferably 20%-50%, more preferably 25%-45% by weight of at least one blocked polyisocyanate adduct, blocked with alkylphenols,
B) 4%-30%, preferably 7%-25%, more preferably 9%-20% by weight of at least one hydroxy polyester containing ester and/or imide and/or amide groups,
C) 20%-70%, preferably 30%-60%, more preferably 35%-45% by weight of hydrocarbon-based organic solvents,
D) 1%-20%, preferably 5%-18%, more preferably 10%-16% by weight of further auxiliaries and additives,
the sum of the components A)+B)+C)+D) adding up to 100% by weight.

DETAILED DESCRIPTION OF THE INVENTION

Suitability for preparing the blocked polyisocyanate adduct A) for use in accordance with the invention is possessed by aromatic, aliphatic, and cycloaliphatic polyisocyanates a), preferably polyisocyanates with a uniform or mean-average molecular weight of 140-600, with an NCO functionality of 2-4. Such polyisocyanates are, for example, propylene diisocyanate, ethylethylene diisocyanate, 3,3,4-trimethylhexamethylene diisocyanate, 1,3-cyclopentyl diisocyanate, 1,4,-cyclohexyl diisocyanate, 1,2-cyclohexyl diisocyanate, 1,3- and 1,4-phenylene diisocyanate, 2,4- and 2,6-diisocyanatotoluene (TDI) and also mixtures of these isomers and their dimers and trimers, 4,4- 2,4-, and 2,2-diisocyanatodiphenylmethane (MDI) and also mixtures of these isomers, or mixtures of these isomers with their higher homologs, as obtained in a known way by phosgenation of aniline/formaldehyde condensates, 1,5-naphthylene diisocyanate, 1,4-butane diisocyanate, 2-methylpentane 1,5-diisocyanate, 1,5-hexane diisocyanate, 1,6-hexane diisocyanate (HDI), 1,3- and 1,4-cyclohexane diisocyanate and also mixtures of these isomers, 2,4- and 2,6-diisocyanato-1-methylcyclohexane and also mixtures of these isomers, 3,5,5-trimethyl-3-isocyanatomethylcyclohexane isocyanate (IPDI), and dicyclohexylmethane 2,4- and 4,4-diisocyanate and mixtures of these isocyanates, 4,4'-diisocyanatodiphenyl ether, and 2,3-bis(8-isocyanatooctyl)-4-octyl-5-hexylcyclohexene, 1-isocyanatomethyl-5-isocyanato-1,3,3-trimethylcyclohexane, 4,4'-biphenylene diisocyanate, 1,4-naphthylene diisocyanate. Preferred as starting isocyanates are aromatic polyisocyanates having an NCO functionality of 2-3.

Suitability as co-reactants to the isocyanates a), for the formation of adducts, is possessed by polyhydric alcohols b), preferably ethylene glycol, 1,2- and 1,3-propylene glycol, 1,2-, 1,3- and 1,4-butanediol, 1,5-pentanediol, neopentyl glycol, diethylene glycol, triethylene glycol, bisphenols, and/or triols, preferably glycerol, trimethylolethane, trimethylolpropane or tris-2-hydroxyethyl isocyanurate (THEIC). Preference is given to using triols, more particularly trimethylolpropane and glycerol. Very particular preference is given to an adduct of 1 mol of trimethylolpropane and 3 mol of 4,4- 2,4-, and 2,2-diisocyanatodiphenylmethane (MDI), and also mixtures of these isomers, or mixtures of these isomers with their higher homologs, as obtained in a known way by phosgenating aniline/formaldehyde condensates.

Blocking agents used in accordance with the invention are alkylphenols. Preferred for the formulation of cresol-free, solderable wire enamels are blocking agents such as alkylated phenols, the alkyl chain being composed of 2-6 carbon atoms and being able to be linear or else branched. In the case of monosubstituted alkylphenols, the alkyl radical comprises at least two carbon atoms. Apart from the monosubstituted phenols it is also possible to use di- and trisubstituted phenols. Of particular preference are butylated phenols, such as o-, m-, p-butylphenol, o-sec-butylphenol, m-sec-butylphenol, p-sec-butylphenol, di-sec-butylphenols. The product employed with maximum preference in accordance with the invention is a mixture of sec-butylphenols. One example of a commercial product is Isosolve® 231 from the SI-Group®.

In one version of the present invention an excess of blocking agent can be used when preparing the blocked polyisocyanate adduct, and then acts as an additional solvent or co-solvent.

In accordance with the preferred form of preparation, the blocking agent or blocking agent mixture c) is introduced first. The polyisocyanate or the polyisocyanates a) are added and reacted with the blocking agent. Then the preferred triols and diols b) are added for the formation of adducts, reaction is carried out, and the product is diluted with solvent naphtha.

Most preferred for the purposes of the present invention are blocked polyisocyanate adducts A) which are synthesized from i) diisocyanate, more particularly 4,4-diisocyanatodiphenylmethane,
ii) polyol, more particularly trimethylolpropane, and
iii) substituted phenol, preferably butyl-substituted phenols, more particularly a mixture of sec-butylphenols.

Suitability for preparing the hydroxy polyesters B) for use in accordance with the invention is possessed by polyhydric alcohols d), preferably ethylene glycol, 1,2- and 1,3-propylene glycol, 1,2-, 1,3- and 1,4-butanediol, 1,5-pentanediol, neopentyl glycol, diethylene glycol, triethylene glycol and/or triols, preferably glycerol, trimethylolethane, trimethylolpropane or tris-2-hydroxyethyl isocyanurate. Particular preference is given to ethylene glycol, 1,2- and 1,3-propylene glycol, and trimethylolpropane, and also mixtures of these alcohols.

For B) it is additionally possible to use aromatic and aliphatic polycarboxylic acids and also their esterifiable derivatives e): oxalic acid, malonic acid, succinic acid, glutaric acid, adipic acid, pimelic acid, azelaic acid, sebacic acid, maleic acid, fumaric acid, sorbic acid, phthalic acid, isophthalic acid, terephthalic acid, trimesic acid, naphthalenedicarboxylic acids. The esterifiable derivatives are preferably methyl, ethyl, propyl, butyl, amyl, hexyl and octyl esters. It is possible to use the monoesters, the diacyl esters, and the mixtures of these compounds, and also the corresponding acid halides. Also possible for use are anhydrides such as, for example, pyromellitic dianhydride and trimellitic anhydride, naphthalenetetracarboxylic dianhydrides, or dianhydrides of tetracarboxylic acids having two benzene nuclei in the molecule, where the carboxyl groups are present in 3,3',4- and 4'-position. Terephthalic acid and trimellitic anhydride are preferred.

In one preferred version, furthermore, it is possible for B) to use aromatic and aliphatic monocarboxylic acids and also their esterifiable derivatives in order, as an end-group cap, to improve the solubility of the hydroxy polyester in solvent naphtha; that is, some of the terminal hydroxyl groups can be esterified with monocarboxylic acids. Examples thereof are butyric acid, hexanoic acid, stearic acid, o-, m-, p-methyl-/ethyl-/propyl-/butylbenzoic acids. Particularly preferred are the tert-butylbenzoic acids.

The skilled worker is aware that the polyester polyols B) can be imide-modified in order to improve the profile of thermal properties. Suitability for the imide modification of the polyester polyols B) for use in accordance with the invention is possessed by aromatic, aliphatic, and cycloaliphatic diamines f) such as ethylenediamine, tetramethylenediamine, hexamethylenediamine, nonamethylenediamine, benzidine, diaminodiphenylmethane, diaminodiphenyl sulfone, sulfoxide, ether, and thioether, phenylenediamines, tolylene, dioxylylene, diamines having three benzene nuclei in the molecule, e.g., 1,4-bis(4-aminophenoxy)benzene, 4,4'-dicyclohexylmethanediamine, monoethanolamine and monopropanolamines, and also aminocarboxylic acids such as glycine, aminopropanoic acid, aminocaproic acids or aminobenzoic acids. Preferred diamines are aromatic diamines such as diaminodiphenyl methane, diaminodiphenyl sulfone, sulfoxide, ether, and thioether, and phenylenediamines.

Very much preferred in the context of the present invention are polyesterpolyols B) synthesized from alkanediol, more particularly 1,2-propylene glycol,
triol, more particularly trimethylolpropane,
polycarboxylic anhydride, more particularly phthalic anhydride,
polycarboxylic ester, more particularly dimethyl terephthalate, and
aromatic acids, more particularly p-tert-butylbenzoic acid.

The polyester resins and modified polyester resins are prepared using the known transesterification catalysts. Examples of those suitable include heavy metal salts, organic titanates and zirconates, zinc compounds, tin compounds, and cerium compounds, and also organic acids such as p-toluenesulfonic acid. For the preparation of the polyesters, suitable catalysts are used in amounts of 0.01% to 5%, preferably 0.3% to 3%, by weight, based on the batch mixture.

According to one preferred form of preparation for component B), the preferred polyhydric alcohols d), the preferred carboxylic acids and also their esterifiable derivatives and anhydrides e), and the preferred esterification catalyst are introduced first and are condensed at a temperature of 100-

200° C., preferably 140-180° C. Where an imide-modified component B is to be prepared, the imide-forming components, preferred diamine f) with preferred anhydride e), in the ratio of 1:3 to 3:1, preferably 1:0.8 to 0.8:1, are added, in one go or in portions. The temperature is raised gradually to 180 to 250° C., preferably 190° C. to 230° C., and maintained until the distillate has been obtained. Dilution takes place with solvent naphtha to the desired solids content.

By hydrocarbon-based organic solvents are meant, preferably, those which are composed exclusively of carbon and hydrogen.

Suitable organic solvents C) for the binders prepared are, in one version, those selected from the group consisting of xylene, solvent naphtha, toluene, ethylbenzene, cumene, heavy benzene, various Solvesso® and Shellsol® grades, Deasol®, and mixtures thereof.

The skilled worker knows these three brand names/branded products sufficiently well, and so a further, more detailed description is unnecessary; these products are characterized essentially by their respective boiling range and not by their precisely defined chemical composition; they are, essentially, different mixtures of aromatic hydrocarbons, hydrocarbon mixtures, and aromatics-rich hydrocarbon mixtures.

Suitable hydrocarbon mixtures are those having a boiling range of 155 to 175° C., composed of up to 99% by weight of aromatic hydrocarbons having 9 or 10 carbon atoms; one example thereof is Deasorl® 99.

Also suitable are mixtures of high-boiling aromatics with a boiling range of 150 to 170° C. (an example being Deasodl®).

Suitability is possessed among others by mixtures of toluene, xylene and aliphatic hydrocarbons, e.g., Shellsol® X7B, mixtures of primarily $C_9$ hydrocarbons with a more than 99% aromatic fraction, e.g., Shellsol® A100; mixtures of $C_9$-$C_{11}$ hydrocarbons with a more than 99% aromatic fraction, e.g., Shellsol® A150; and also narrow hydrocarbon cuts having a flash point of >61° C., e.g., Shellsol® A150 ND.

Suitable organic solvents C) for the binders prepared are, in another version, those selected from the group consisting of xylene, solvent naphtha, toluene, ethylbenzene, cumene, heavy benzene, $C_9$ and $C_{10}$ aromatics mixtures, $C_{10}$-$C_{13}$ aromatics mixtures, mixtures of toluene, xylene, and aliphatic hydrocarbons, mixtures of primarily $C_9$ hydrocarbons with a more than 99% aromatic fraction, mixtures of $C_9$-$C_{11}$ hydrocarbons with a more than 99% aromatic fraction, narrow hydrocarbon cuts having a flash point of >61° C., and mixtures thereof.

Suitable organic solvents C) for the binders prepared are, in another version, those selected from the group consisting of xylene, solvent naphtha, toluene, ethylbenzene, cumene, heavy benzene, $C_9$ and $C_{10}$ aromatics mixtures, $C_{10}$-$C_{13}$ aromatics mixtures, mixtures of primarily $C_9$ hydrocarbons with a more than 99% aromatic fraction, mixtures of $C_9$-$C_{11}$ hydrocarbons with a more than 99% aromatic fraction, and mixtures thereof.

In one version of the present invention it is possible, in addition to the stated solvents, for the blocking agent used for component A) to be present as part of component C), if it has been added in excess during the preparation of component A).

Besides the components described, the polyurethane-based coating materials further comprise customary auxiliaries and additives D). As auxiliaries for the wire-coating materials it is possible, for example, to employ flow-improving phenolic or melamine resins or other customary flow control agents, based for example on polyacrylates and polysiloxanes. The person skilled in the enamels art is also aware that high boilers such as alkylene carbonates, phthalic esters, high-boiling hydrocarbons such as alkylated benzenes and naphthalenes, alkylated phenols, relatively high-boiling alcohols, e.g., butanol and/or benzyl alcohol, etc., have a positive effect on flow and film formation. The boundary between additive and co-solvents is in many cases a fluid one.

The polyurethane wire enamels of the invention may further comprise crosslinking catalysts. In the case of polyurethane-based wire-coating materials, organometallic compounds of, for example, the metals potassium, magnesium, aluminum, tin, lead, zinc, iron, titanium, bismuth, antimony and zirconium, and also tertiary amines, have established themselves as crosslinking catalysts, which are used customarily in amounts of 0.2% to 2.0% by weight, based on the total weight of hydroxyl-containing polyesters and blocked isocyanate adducts.

One preferred group of activators or crosslinking catalysts are condensation products of aldehydes with amines, more preferably of aliphatic aldehydes and aromatic amines, with particular preference being given to the reaction product of butyraldehyde with aniline. One example of a commercially available product is Vulkacit® 576 from Lanxess.

In one version according to the invention, the hydroxyl-containing polyesters B) and the blocked isocyanate adduct A) are used together in an amount of 14% to 90%, preferably of 27% to 75%, more preferably of 34% to 65% by weight, based on the total weight of the polyurethane wire enamel. The amount of hydroxyl-containing polyester in this case is preferably between 30 and 60, more particularly 37 to 50 parts by weight per 100 parts by weight of blocked isocyanate adduct, depending on the OH equivalent of the (modified) polyester and on the amount of blocked NCO groups in the isocyanate adducts. The ratio of hydroxyl groups to isocyanate groups here may be from 3:1 to 1:3, preferably 2:1 to 1:2.

In the very much preferred embodiment according to the invention, the polyurethane wire enamel of the invention is composed of A) 25%-45% by weight of at least one blocked polyisocyanate adduct, blocked with butylated phenols, preferably with a mixture of sec-butylphenols,
B) 9%-20% by weight of at least one hydroxy polyester containing ester and/or imide and/or amide groups,
C) 35%-45% by weight of hydrocarbon-based organic solvents,
D) 10%-16% by weight of further auxiliaries and additives, the sum of the components A)+B)+C)+D) adding up to 100% by weight, and where
the blocked polyisocyanate adducts A) are synthesized from 4,4-diisocyanatodiphenylmethane, trimethylolpropane, and a mixture of sec-butylphenols,
and/or
the polyester polyols B) are synthesized from 1,2-propylene glycol, trimethylolpropane, phthalic anhydride, dimethyl terephthalate, and p-tert-butylbenzoic acid.

The polyurethane wire enamels are applied and cured by means of customary wire enameling machines. The enamel film thickness required in each case is built up by at least 1 and up to 20, preferably 1 to 10, individual applications, with each individual enamel application being cured to a blister-free state before the next enamel application. Customary enameling machines operate with take-off speeds of 5 m/min up to several hundred m/min, depending on the thickness of the wire to be coated. Typical oven temperatures lie between 300 and 550° C.

Preferred enameling conditions:
Temperature: about 500° C.
Applicator system: felt
Wire diameter: 0.50 mm Number of passes: 8
Degree of increase: 2 L The enameled wires are tested in accordance with IEC 60851.

A great advantage of the wire enamels of the invention is that, viewed overall, they are composed of cheaper raw materials than conventional wire enamels, particularly in respect of the solvents used.

The wire enamels of the invention, moreover, are less environmentally burdensome.

This represents great advantages both environmentally and economically.

The different embodiments of the present invention, as for example those of the various dependent claims, can be combined with one another in any desired way.

The invention is now elucidated with reference to the following, nonlimiting examples.

Example 1

Preparation of a Blocked Polyisocyanate Adduct A1

A reaction apparatus with a condensate separator was charged, with stirring and introduction of nitrogen, with 108 g of Isosolve 231®, 216 g of solvent naphtha, and 271 g of 4,4-diisocyanatodiphenylmethane. The batch was heated to 40° C. Separately, a mixture of 41 g of trimethylolpropane and 164 g of Isosolve 231® was prepared. This solution was added to the flask. The temperature is raised to 60° C. Then 0.2 g of dibutyltin dilaurate was added. The temperature rose as a result of the reaction. It was maintained at 120° C. for an hour. The batch was cooled to 80° C. and the remaining solvents, 97 g of solvent naphtha, 49 g of dimethyl phthalate, and 49 g of propylene carbonate, were added, followed by stirring for 2 hours. The polyisocyanate adduct obtained had a viscosity of about 3900 mPas (23° C.) and a solids content of 52% (1 g/1 h/130° C.).

Example 2

Preparation of a Blocked Polyisocyanate Adduct A2

A reaction apparatus with a condensate separator was charged, with stirring and introduction of nitrogen, with 350 g of Isosolve 231® and 265 g of 4,4-diisocyanatodiphenylmethane. The batch was heated to 120° C. Then 0.1 g of dibutyltin dilaurate was added and the batch was stirred for an hour. It was cooled to 100° C. and 40 g of trimethylolpropane were added. The temperature was raised to 150° C. and, after half an hour, at 80° C., 344 g of solvent naphtha were added, followed by stirring for 2 hours. The polyisocyanate adduct obtained had a viscosity of about 3400 mPas (23° C.) and a solids content of 49% (1 g/1 h/130° C.).

Example 3

Preparation of an Inventive Hydroxy Polyester B1

A reaction apparatus with a condensate separator was charged, with stirring and introduction of nitrogen, with the following components: 51 g of 1,2-propylene glycol, 188 g of trimethylolpropane, 101 g of phthalic anhydride, and 0.4 g of zinc acetate. This initial charge was then heated to 215° C. After the end of the distillation, the batch was cooled to 165° C. and 132 g of dimethyl terephthalate and 132 g of p-tert-butylbenzoic acid were added. At 218° C., the batch was condensed to completion. At 165° C. it was diluted with 395 g of solvent naphtha. The hydroxy polyester B1 thus prepared had a viscosity of 3000 mPas (30° C.) and a solids of 43% (1 g/1 h/180° C.).

Example 4

Preparation of an Inventive Hydroxy Polyester B2

A reaction apparatus with a condensate separator was charged, with stirring and introduction of nitrogen, with the following components: 43 g of 1,2-propylene glycol, 165 g of trimethylolpropane, 89 g of phthalic anhydride, and 0.4 g of zinc acetate. This initial charge was then heated to 215° C. After the end of the distillation, the batch was cooled to 165° C. and 116 g of dimethyl terephthalate and 116 g of p-tert-butylbenzoic acid were added. At 218° C., the batch was condensed to completion. At 165° C. it was diluted with 391 g of solvent naphtha and 78 g of dimethyl phthalate. The hydroxy polyester B1 thus prepared had a viscosity of 3200 mPas (30° C.) and a solids of 44% (1 g/1 h/180° C.).

Example 5

Production of an Inventive Wire Enamel 1

A mixer was charged with the following PU enamel ingredients: 485 g of polyisocyanate adduct A1, 183 g of hydroxy polyester B1, 145 g of solvent naphtha, 2 g of Vulkacit® 576, 2 g of dibutyltin dilaurate, 17 g of butanol, 43 g of benzyl alcohol. The enamel batch was stirred thoroughly for 4 hours. Using 121 g of solvent naphtha, the wire enamel was adjusted to a solids of 42% (3 g/1 h/180° C.) and to 370 mPas (23° C.).

Example 6

Production of an Inventive Wire Enamel 2

A mixer was charged with the following PU enamel ingredients: 572 g of polyisocyanate adduct A2, 253 g of hydroxy polyester B2, 169 g of solvent naphtha, 2 g of Vulkacit® 576, and 2 g of dibutyltin dilaurate. The enamel batch was stirred thoroughly for 2 hours. Using solvent naphtha, the wire enamel was adjusted to a solids of 37% (3 g/1 h/180° C.) and to 330 mPas (23° C.).

Enameling Results:

The inventive wire enamels were applied to 0.5 mm wire on a SICME SEL450 with dies and eight passes at 45 m/min, with an increase of 2 L. The enameled wires were tested in accordance with IEC 60851.

Test Results:

|  | Wire enamel 1 | Wire enamel 2 |
|---|---|---|
| Outer fiber elongation |  |  |
| 1xD 10% | 3\3 | 3\3 |
| 1xD 15% | 2\3 | 2\3 |
| 1xD 20% | 0\3 | 0\3 |
| Thermal shock 180° C., 30 min. | 2xD ok | 2xD ok |
| Thermal pressure | 250° C. ok | 240° C. ok |
| Breakdown voltage | 6.8 kV | 6.9 kV |
| Tangent-delta (Tgδ) inflection point | 158° C. | 155° C. |
| Solder time | 3.5 s | 3.5 s |
| Pin hole (12 V, 6 m) 5% preliminary elongation | 0/0/4 | 0/0/2 |

The results correspond to those of commercial cresolic wire enamels.

What is claimed is:

1. A polyurethane wire enamel, wherein the enamel is present in cresol-free solution and is composed of:
   (A) from 10% to 60% by weight of at least one polyisocyanate adduct blocked with one or more alkylphenols which comprise a mixture of sec-butylphenols,
   (B) from 4% to 30% by weight of at least one hydroxy polyester optionally comprising at least one of imide groups and amide groups;
   (C) from 20% to 70% by weight of one or more hydrocarbon-based organic solvents which are composed exclusively of carbon and hydrogen,
   (D) from 1% to 20% by weight of one or more auxiliaries and additives,
   the sum of (A)+(B)+(C)+(D) being 100% by weight.

2. The polyurethane wire enamel of claim 1, wherein the enamel comprises from 20% to 50% by weight of (A), from 7% to 25% by weight of (B), from 30% to 60% by weight of (C), and from 5 to 18% by weight of (D).

3. The polyurethane wire enamel of claim 1, wherein the enamel comprises from 25% to 45% by weight of (A), from 9% to 20% by weight of (B), from 35% to 55% by weight of (C), and from 10 to 16% by weight of (D).

4. The polyurethane wire enamel of claim 1, wherein (C) comprises solvent naphtha.

5. The polyurethane wire enamel of claim 1, wherein (C) further comprises a blocking agent used for component (A).

6. The polyurethane wire enamel of claim 1, wherein a portion of terminal hydroxyl groups of (B) is esterified with one or more monocarboxylic acids.

7. The polyurethane wire enamel of claim 6, wherein the one or more monocarboxylic acids comprise at least one tert-butylbenzoic acid.

8. The polyurethane wire enamel of claim 1, wherein (A) and (B) are present in a combined amount of from 27% to 75% by weight, based on a total weight of the wire enamel.

9. The polyurethane wire enamel of claim 1, wherein (A) and (B) are present in a combined amount of from 34% to 65% by weight, based on a total weight of the wire enamel.

10. The polyurethane wire enamel of claim 8, wherein from 30 to 60 parts by weight of (B) are present per 100 parts by weight of (A).

11. The polyurethane wire enamel of claim 9, wherein from 37 to 50 parts by weight of (B) are present per 100 parts by weight of (A).

12. The polyurethane wire enamel of claim 8, wherein a ratio of hydroxyl groups of (B) to isocyanate groups of (A) is from 3:1 to 1:3.

13. The polyurethane wire enamel of claim 1, wherein (A) is synthesized from 4,4-diisocyanatodiphenylmethane, trimethylolpropane, and a mixture of sec-butylphenols.

14. The polyurethane wire enamel of claim 1, wherein (B) is synthesized from 1,2-propylene glycol, trimethylolpropane, phthalic anhydride, dimethyl terephthalate, and p-tert-butylbenzoic acid.

15. A polyurethane wire enamel, wherein the enamel is present in cresol-free solution and is composed of:
   (A) from 10% to 60% by weight of at least one polyisocyanate adduct blocked with one or more alkylphenols,
   (B) from 4% to 30% by weight of at least one hydroxy polyester optionally comprising at least one of imide groups and amide groups, a portion of terminal hydroxy groups of the at least one hydroxy polyester being esterified with one or more monocarboxylic acids which comprise at least one tert-butylbenzoic acid;
   (C) from 20% to 70% by weight of one or more hydrocarbon-based organic solvents which are composed exclusively of carbon and hydrogen,
   (D) from 1% to 20% by weight of one or more auxiliaries and additives,
   the sum of (A)+(B)+(C)+(D) being 100% by weight.

16. The polyurethane wire enamel of claim 15, wherein the enamel comprises from 20% to 50% by weight of (A), from 7% to 25% by weight of (B), from 30% to 60% by weight of (C), and from 5 to 18% by weight of (D).

17. The polyurethane wire enamel of claim 15, wherein the enamel comprises from 25% to 45% by weight of (A), from 9% to 20% by weight of (B), from 35% to 55% by weight of (C), and from 10 to 16% by weight of (D).

18. The polyurethane wire enamel of claim 15, wherein (C) comprises solvent naphtha.

19. A method of coating a copper wire or an aluminum wire, wherein the method comprises applying to the copper wire or aluminum wire the polyurethane wire enamel of claim 1.

20. A method of coating a copper wire or an aluminum wire, wherein the method comprises applying to the copper wire or aluminum wire the polyurethane wire enamel of claim 15.

* * * * *